(12) United States Patent  
Strock et al.

(10) Patent No.: US 8,770,927 B2
(45) Date of Patent: Jul. 8, 2014

(54) ABRASIVE CUTTER FORMED BY THERMAL SPRAY AND POST TREATMENT

(75) Inventors: Christopher W. Strock, Kennebunk, ME (US); Changsheng Guo, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 736 days.

(21) Appl. No.: 12/911,004

(22) Filed: Oct. 25, 2010

(65) Prior Publication Data

US 2012/0099985 A1  Apr. 26, 2012

(51) Int. Cl.
*F01D 5/20* (2006.01)
*F01D 11/08* (2006.01)
*F04D 29/18* (2006.01)

(52) U.S. Cl.
USPC ..................................... 415/173.4; 415/174.4

(58) Field of Classification Search
CPC ..... F01D 11/001; F01D 11/122; F01D 11/14; F01D 11/12; F01D 11/00; F01D 11/08; F01D 11/03; F05D 2230/13; F05D 2240/55
USPC .......... 415/173.4, 174.4, 173.1, 174; 416/174
See application file for complete search history.

(56) References Cited

U.S. PATENT DOCUMENTS

| | | | |
|---|---|---|---|
| 4,227,703 A | 10/1980 | Stalker et al. | |
| 4,238,170 A | 12/1980 | Robideau et al. | |
| 4,588,607 A | 5/1986 | Matarese et al. | |
| 4,783,341 A | 11/1988 | Packer et al. | |
| 4,861,618 A | 8/1989 | Vine et al. | |
| 4,884,820 A * | 12/1989 | Jackson et al. ................ | 277/415 |
| 4,936,745 A | 6/1990 | Vine et al. | |
| 5,113,582 A | 5/1992 | Monson et al. | |
| 5,434,210 A | 7/1995 | Rangaswamy et al. | |
| 5,536,022 A | 7/1996 | Sileo et al. | |
| 5,562,404 A | 10/1996 | Koff et al. | |
| 5,645,399 A | 7/1997 | Angus | |
| 5,705,231 A | 1/1998 | Nissley et al. | |
| 5,715,596 A | 2/1998 | Bintz | |
| 5,780,116 A | 7/1998 | Sileo et al. | |
| 5,780,171 A | 7/1998 | Nissley et al. | |
| 5,879,753 A | 3/1999 | Zajchowski et al. | |

(Continued)

FOREIGN PATENT DOCUMENTS

EP        1985807 A2    10/2008

OTHER PUBLICATIONS

Article entitled "On the Potential of Metal and Ceramic Based Abradables in Turbine Seal Applications", Proceedings of the Thirty-Sixth Turbomachinery Symposium—2007, Dieter Sporer et al., pp. 79-86.

(Continued)

*Primary Examiner* — Edward Look
*Assistant Examiner* — Christopher J Hargitt
(74) *Attorney, Agent, or Firm* — Kinney & Lange, P.A.

(57) ABSTRACT

A seal for a gas turbine engine component having an airfoil with a radial outward end and a radial inward end, one of which is bare metal. A seal member is adjacent to the bare metal end of the airfoil wherein the seal member is coated with a abrasive layer having a laser engraved surface with the top of the surface has less than about 5% of the surface area of the base of the abrasive layer.

17 Claims, 4 Drawing Sheets

(56) References Cited

U.S. PATENT DOCUMENTS

| | | |
|---|---|---|
| 5,950,308 A | 9/1999 | Koff et al. |
| 6,089,825 A | 7/2000 | Walden et al. |
| 6,102,656 A | 8/2000 | Nissley et al. |
| 6,177,174 B1 | 1/2001 | Legrand |
| 6,190,124 B1 | 2/2001 | Freling et al. |
| 6,203,021 B1 * | 3/2001 | Wolfla et al. .................. 277/415 |
| 6,358,002 B1 | 3/2002 | Good et al. |
| 6,383,658 B1 | 5/2002 | Carlson et al. |
| 6,537,021 B2 | 3/2003 | Howard et al. |
| 6,703,137 B2 | 3/2004 | Subramanian |
| 7,241,108 B2 * | 7/2007 | Lewis ....................... 415/173.4 |
| 7,407,369 B2 | 8/2008 | Schwarz et al. |
| 7,510,370 B2 | 3/2009 | Strangman et al. |
| 2004/0005452 A1 | 1/2004 | Dorfman et al. |
| 2006/0140756 A1 | 6/2006 | Schwarz et al. |
| 2008/0063520 A1 | 3/2008 | Baumann et al. |
| 2008/0087023 A1 | 4/2008 | Suciu et al. |
| 2008/0219835 A1 | 9/2008 | Freling et al. |
| 2008/0226879 A1 | 9/2008 | Strock et al. |
| 2009/0017260 A1 | 1/2009 | Kulkarni et al. |
| 2009/0097970 A1 | 4/2009 | Tholen et al. |
| 2009/0136740 A1 * | 5/2009 | Reynolds et al. ............. 428/325 |
| 2009/0176110 A1 * | 7/2009 | Pabla et al. ................... 428/450 |
| 2010/0098923 A1 | 4/2010 | Freling et al. |
| 2010/0143103 A1 | 6/2010 | Sellars et al. |

OTHER PUBLICATIONS

Article entitled "Increased Efficiency of Gas Turbines", New High-Temperature Seal System, Sulzer Technical Review Feb. 2008, Dieter Sporer et al., pp. 1-4.

European Search Report, mailed Apr. 19, 2012.

* cited by examiner

ABRASIVE CUTTER FORMED BY THERMAL SPRAY AND POST TREATMENT

CROSS-REFERENCE TO RELATED APPLICATIONS

This application is related to the following co-pending applications that are filed on even date herewith and are assigned to the same assignee: ABRASIVE ROTOR COATING FOR FORMING A SEAL IN A GAS TURBINE ENGINE, Ser. No. 12/910,989; ROUGH DENSE CERAMIC SEALING SURFACE IN TURBOMACHINES, Ser. No. 12/910,973; THERMAL SPRAY COATING PROCESS FOR COMPRESSOR SHAFTS, Ser. No. 12/910,994; FRIABLE CERAMIC ROTOR SHAFT ABRASIVE COATING, Ser. No. 12/910,966; ABRASIVE ROTOR SHAFT CERAMIC COATING, Ser. No. 12/910,960; LOW DENSITY ABRADABLE COATING WITH FINE POROSITY, Ser. No. 12/910,982; and SELF DRESSING, MILDLY ABRASIVE COATING FOR CLEARANCE CONTROL, Ser. No. 12/910,954. The disclosures of these applications are incorporated herein by reference in their entirety.

BACKGROUND

Gas turbine engines include compressor rotors including a plurality of rotating compressor blades. Minimizing the leakage of air between tips of the compressor blades and a casing of the gas turbine engine increases the efficiency of the gas turbine engine as the leakage of air over the tips of the compressor blades can cause aerodynamic efficiency losses. The abradability of the seal material prevents damage to the blades while the seal material itself wears to generate an optimized mating surface and thus reduce the leakage of air.

Abradable seals have also been used in turbines to reduce the gap between a rotor and a vane. Thermally sprayed abradable seals have been used in gas turbine engines since the late 1960s. The seals have been made as coatings from composite materials that derive their abradability from the use of low shear strength materials or from a porous, friable coating.

The high conductivity of conventional alumina rotor coatings causes thermal runaway events when rub occurs between vanes and the rotor shaft. The runaway event is caused by heat generation during rub that raises the temperature of both the vane tips and the rotor shaft, especially when the rub contact is limited to only a portion of the rotor's circumference. The heat generated causes expansion of the parts, which increases the rub forces, leading to more heat and then more expansion. The cycle becomes self propagating and has resulted in rotor shaft burn through.

In the past, cantilevered vane rubs have been typically limited to less than 2 mils (50.4 microns) and have less than full circumference contact due to the risks of high rub forces, coating spallation or a thermal runaway event where the heat from the rub causes thermal expansion of the rotor. The rotor, when heated sufficiently, can grow out to interfere with the vanes. The result can be a burn through causing holes in the rotating shaft, which can cause subsequent unscheduled engine removal.

SUMMARY

The present invention comprises a gas turbine engine component and the method of making the same. The component includes an airfoil with a radial outword end and a radial inward end that is to be used with a seal member adjacent to the radial inward end of the airfoil. The seal member is coated with a ceramic layer which is then processed with a laser to have a laser engraved surface in which the top of the surface has less than about 5% of the surface area of the base of the ceramic layer.

The ceramic layer has a hardness of at least 7 on the Mohs mineral hardness scale. Examples of ceramics that form this ceramic layer are quartz, cubic zirconia, corundrum and diamond. The thickness should range from about 50 microns to about 500 microns.

DETAILED DESCRIPTION

Figure 1:
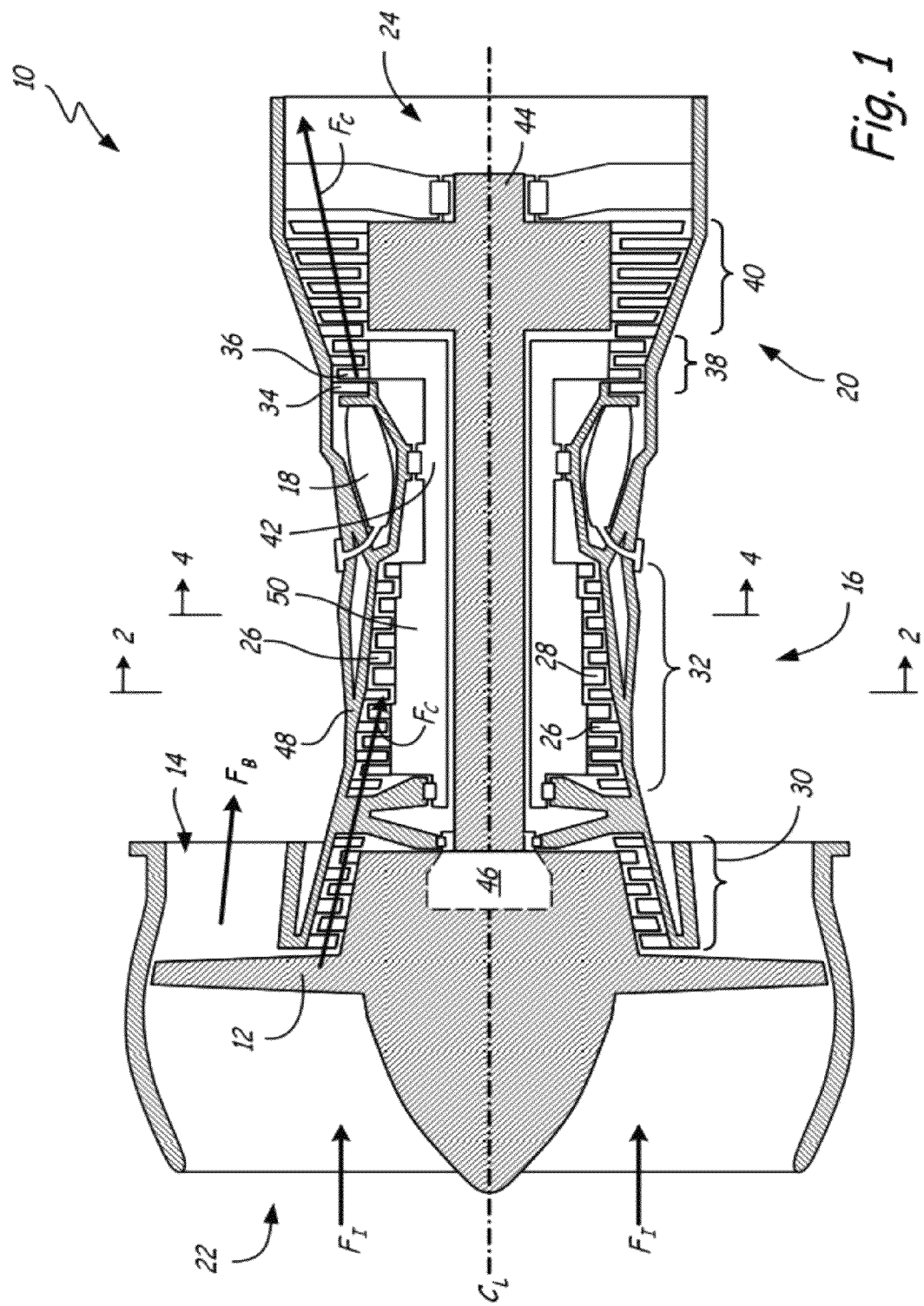
FIG. 1 illustrates a simplified cross-sectional view of a standard gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 32, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
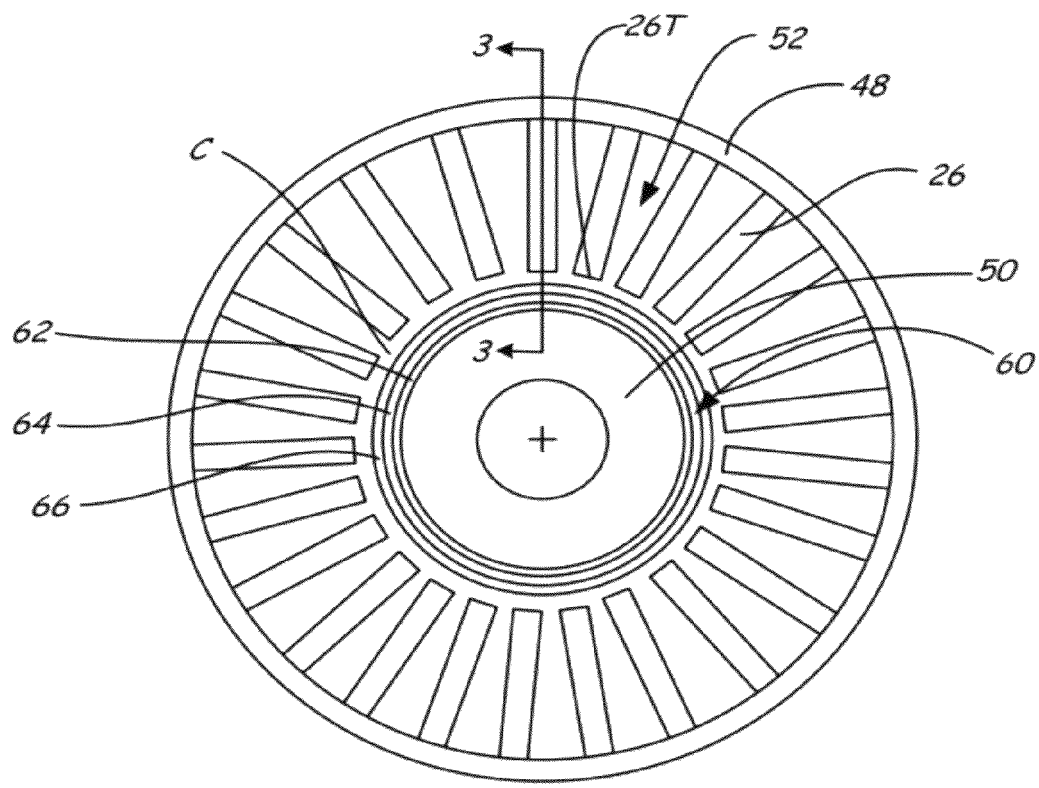
FIG. 2 illustrates a simplified cross sectional view illustrating the relationship of the rotor and vanes taken along the line 2-2 of FIG. 1, not to scale.
Figure 3:
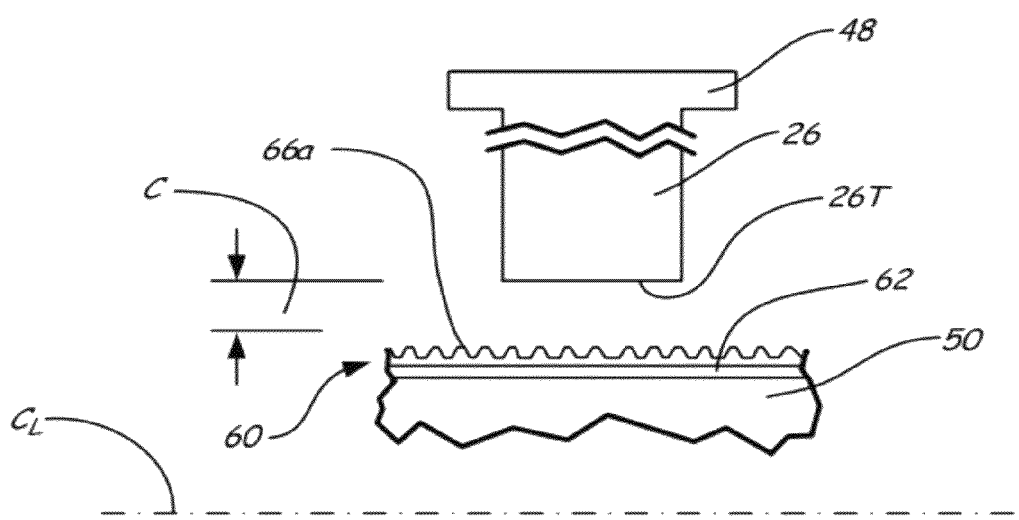
FIG. 3 is a cross sectional view taken along the line 3-3 of FIG. 2, not to scale.
Figure 4:
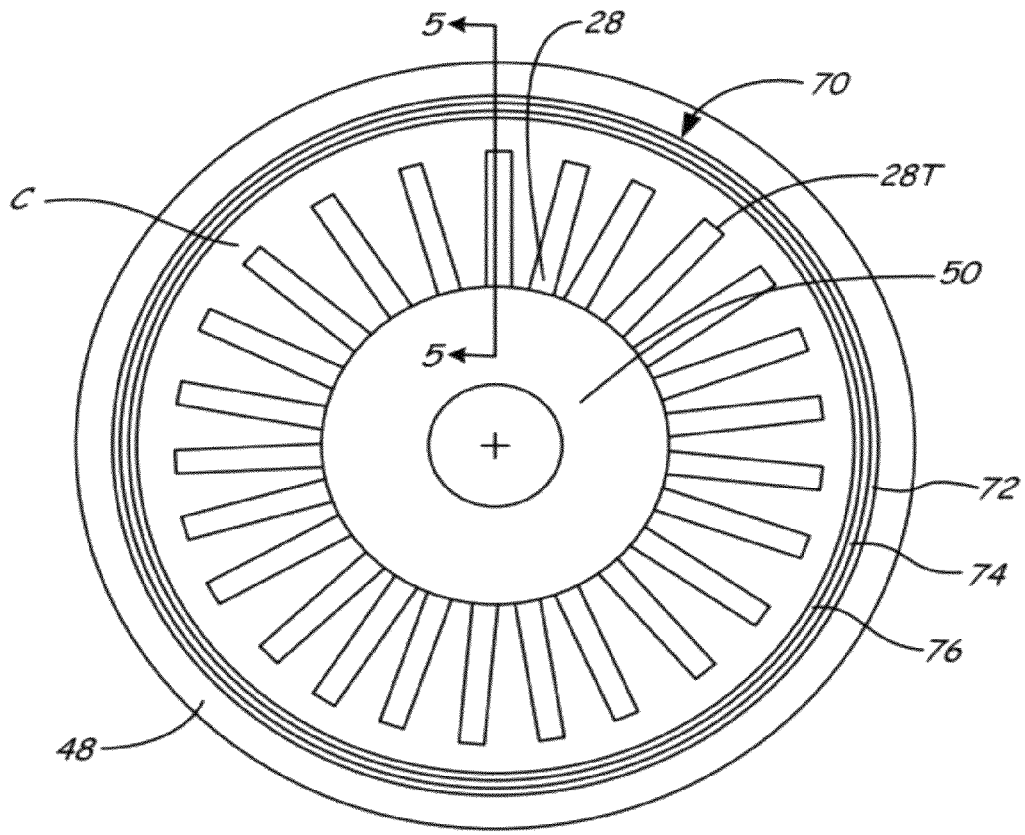
FIG. 4 is a cross sectional view taken along line 4-4 of FIG. 1 of one embodiment of the invention.
Figure 5:
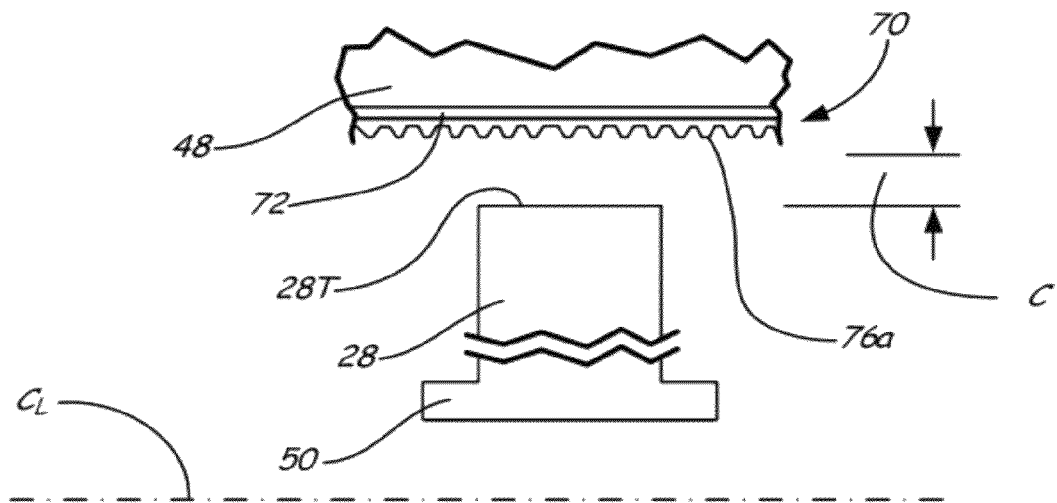
FIG. 5 is a cross sectional view taken along the line 5-5 of FIG. 4, not to scale.

The present invention is intended to be used with airfoils in turbine engines. The term "airfoil" is intended to cover both rotor blades and stator vanes. FIG. 2 and FIG. 3 disclose the invention with respect to interaction of a stator vane with a rotor. FIG. 4 and FIG. 5 disclose the invention with respect to interaction of a rotor blade with a stator casing or shroud. The coating of this invention may be used with either or both configurations.

FIG. 2 is a cross section along line 2-2 of FIG. 1 of a casing 48 which has a rotor shaft 50 inside. Vanes 26 are attached to casing 48 and the gas path 52 is shown as the space between vanes 26. Coating 60, corresponding to the coating of this invention, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, about 25 to 55 about mils (about 635 to about 1400 microns) when the engine is cold to 0 to about 35 mils (about 889 microns) during engine operation depending on specific operations and previous rub events that may have occurred.

The new rotor coating is strong enough to abrade the bare super alloy vane tips by themselves thereby eliminating necessity of an abradable coating.

FIG. 2 and FIG. 3 show coating 60 in which includes metallic bond coat 62 and abrasive layer 66. Metallic bond coat 62 is applied to rotor shaft 50. Abrasive layer 66 is deposited on top of bond coat 62 and is the layer that first encounters vane tip 26T.

As can be seen from FIG. 4 and FIG. 5, the same concept is used in which coating 70 is provided on the inner diameter surface of casing or shroud 48. Coating 70 includes a first metallic bond coat 72 that has been applied to the ID of stator casing 48. In other embodiments, stator casing 48 includes a shroud that forms a blade air seal. Abrasive layer 76 is formed on metallic bond coating 72 and is the layer that first encounters rotor tip 28T.

Bond coats 62 and 72 are thin, up to 10 mils, more specifically ranging from about 3 mils to about 7 mils (76 to 178 microns). Abrasive coatings 66 and 76 are much thicker than bond coats 62 and 72, ranging from about 10 mils to about 19 mils (254 to 483 microns).

Bond coats 62 and 72 may be formed of MCrAlY, the metal (M) can be nickel, iron, or cobalt, or combinations thereof and the alloying elements are chromium (Cr), aluminum (Al) and yttrium (Y). For example, bond coats 62 and 64 may be 15-40% Cr 6-15% Al, 0.61 to 1.0%. Y and the balance is cobalt, nickel or iron and combinations thereof. Bond coat layers 62 and 72 are applied by plasma spraying.

Abrasive layer 66 and 76 may be a porous or filled metallic or ceramic material such as SM2042, SM2043, Metco 105NS or Durabrade 2192 available from Sulzer Metco. SM2042 is described in U.S. Pat. No. 5,434,210, which is incorporated by reference herein in its entirety. The selection of suitable abrasive layer material varies with application and is typically a compromise between erosion resistance, wear ratio with vane or blade tips and durability in the subject environment. One example choice may be Metco 105NS aluminum oxide coating with a mechanically roughened surface in an application where low erosion rate of the coating is desired.

Examples of Yttria stabilized zirconia layers 66 and 76 and metal bond coats 62 and 72 are described in commonly owned U.S. Pat. No. 5,879,753 and included herein in its entirety by reference. Coatings 66 and 76 in this patent consist essentially of zirconia containing 11-14 wt. % yttria. Coatings 66 and 76 are applied by plasma spraying, followed by laser engraving to form pyramids 66a and 76a on the surface facing the airfoil, as seen in FIG. 3 and FIG. 5.

Other ceramic coatings may be used, provided that the ceramic has a coating having a hardness of 7 or higher on the Mohs scale of mineral hardness. These may be selected from quartz, zirconia such as those discussed above, corundum and diamond.

Figure 6:
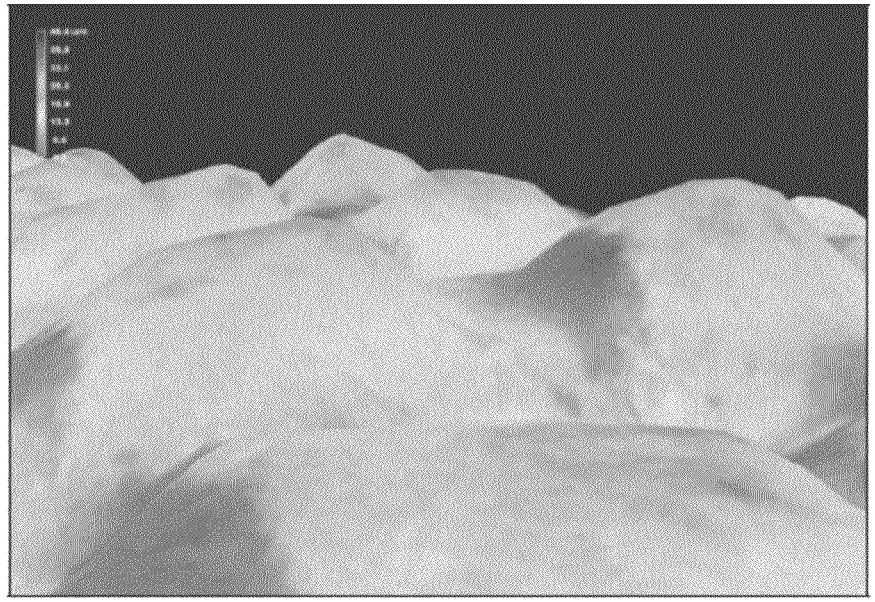
FIGS. 6 and 7 are photographs of embodiments of this invention.
Figure 7:
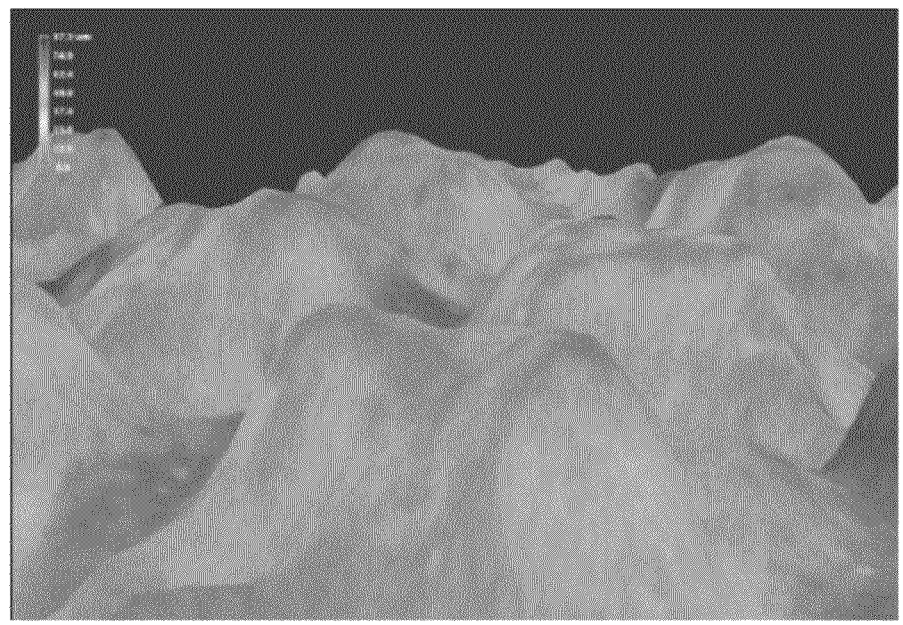

FIG. 6 and FIG. 7 are enlarged photographs of pyramids 66a and 76a of FIG. 3 and FIG. 5. Pyramids 66a and 76a are formed by application of a laser engraving on the surface that will engage the airfoil. The pyramids 66a and 76a were formed using a IPG 20W Q-switched fiber laser with a Nutfield XLR8-10-YAG 2-axis Scan Head with an f-theta 100 mm lens providing a max spot size of 16 μm. The f-theta 100 mm lens alloed for a working distance of 3.85" in length.

FIG. 6 represents a finely spaced grit pattern with grit spacing of 0.005", a texture height of 0.0015", grit side slope of 45 degrees with respect to the surface before laser treatment, and the grits are misaligned in the circumferential direction. FIG. 7 represents a coarsely spaced grit pattern with grit spacing of 0.010", texture height of 0.0015", grid side slope of 45 degrees and grits misaligned in the circumferential direction.

The pattern in FIG. 6 was made at a power of 10 W, a speed of 900 mm/s, and a frequency of 40 kHz. Line length was 70 mm, line width was 0.05 mm, hatch distance was 0.004 mm and line distance was 0.381 mm. The pattern in FIG. 7 was made at a power of 10 W, at a speed of 500 m/s, and a frequency of 40 kHz. Line length was 63.5 mm, line width of 0.126 mm, hatch distance of 0.004 mm and line distance of 0.381 mm.

The laser beam melts and removes parts of the ceramic coatings 66 and 76 at an angle with respect to the plane of the rotor or shroud so that the metallic airfoil encounters a sharp edge and is abraded. Other laser systems and dimensions are within the scope of this invention. In order to produce an effective grit surface using the laser treatment of the ceramic surface, the laser engraved surface with the top of the surface has less than about 5% of the surface area of the base of the ceramic layer. The degree of misalignment of the rows of pyramids can range from 0° to about 90°. The pyramids 66a and 76a of FIGS. 6 and 7 are at a misalignment of 45° with respect to the circumferential direction of rotation about centerline $C_L$. As seen in FIGS. 6 and 7, pyramids 66a and 76a form rows that are placed there by the laser action and the rows can be selectively aligned or misaligned as desired.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a seal in a rotating gas turbine engine component, the method comprising:
   providing an airfoil with a radial outward end and a bare metal airfoil tip at a radial inward end;
   providing a seal member adjacent to the radial inward end of the airfoil wherein the seal member is coated with an abrasive layer having a laser engraved surface comprising a grooved pattern oriented at an angle to the axis of rotation wherein the top of the grooved surface has less than about 5% of the surface area of the base of the abrasive layer.

2. The method of claim 1, wherein the component is a compressor stator vane and the seal member includes a rotor seal surface.

3. The method of claim 1, wherein the component is a compressor rotor blade and the seal member includes a vane seal surface.

4. The method of claim 1, wherein the abrasive layer has a thickness ranging from about 10 mils to about 19 mils (about 254 to about 483 microns).

5. The method of claim 1, wherein the abrasive layer has a hardness of at least 7 on the Mohs scale of mineral hardness.

6. The method of claim 5, wherein the abrasive layer is selected from the group consisting of quartz, cubic zirconia, corundum and diamond.

7. A gas turbine engine comprising:
   an engine casing extending circumferentially about an engine centerline axis; and
   a compressor section, a combustor section, and a turbine section within said engine casing containing rotating components;
   wherein at least one of said compressor section and said turbine section includes at least one airfoil and at least one seal member adjacent to the at least one airfoil, wherein a tip of the at least one airfoil is bare metal and the at least one seal member is coated with an abrasive layer having a laser engraved surface comprising a grooved pattern oriented at an angle to the axis of rotation wherein the top of the grooved surface has less than about 5% of the surface area of the base of the abrasive layer.

8. The engine of claim 7, wherein the airfoil is a compressor stator vane and the seal member includes a rotor seal surface.

9. The engine of claim 7, wherein the airfoil is a compressor rotor blade and the seal member includes a casing or shroud seal surface.

10. The engine of claim 7, wherein the abrasive layer has a thickness ranging from about 10 mils to about 19 mils (about 254 to about 483 microns).

11. The engine of claim 7, wherein the abrasive layer has a hardness of at least 7 on the Mohs scale of mineral hardness.

12. The engine of claim 11, wherein the ceramic layer is selected from the group consisting of quartz, cubic zirconia, corundum and diamond.

13. A gas turbine engine component comprising:
   an airfoil with a radial outward end and a radial inward end;
   a seal member adjacent to the radial inward end of the airfoil wherein the seal member is coated with a abrasive layer having a laser engraved surface comprising a grooved pattern oriented at an angle to an axial direction wherein the top of the grooved surface has less than about 5% of the surface area of the base of the abrasive layer.

14. The component of claim 13, wherein the airfoil is a compressor stator vane and the seal member includes a rotor seal surface.

15. The component of claim 13, wherein the airfoil is a rotating compressor rotor blade and the seal member includes a casing or shroud seal surface.

16. The component of claim 13, wherein the abrasive layer has a thickness ranging from about 10 mils to about 19 mils (about 254 to about 483 microns) and wherein the ceramic layer has a hardness of at least 7 on the Mohs scale of mineral hardness.

17. The component of claim 11, wherein the abrasive layer is selected from the group consisting of quartz, cubic zirconia, corundum and diamond.

* * * * *